United States Patent
Whitaker et al.

(10) Patent No.: US 12,360,738 B1
(45) Date of Patent: **\*Jul. 15, 2025**

(54) VOICE INTERACTION SCRIPTS

(71) Applicant: United Services Automobile Association (USAA), San Antonio, TX (US)

(72) Inventors: Charise Renee Whitaker, San Antonio, TX (US); Michael J. Maciolek, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/161,032

(22) Filed: Jan. 27, 2023

Related U.S. Application Data

(63) Continuation of application No. 17/104,974, filed on Nov. 25, 2020, now Pat. No. 11,593,067.

(60) Provisional application No. 62/941,404, filed on Nov. 27, 2019.

(51) Int. Cl.
| | |
|---|---|
| G06F 3/16 | (2006.01) |
| G06F 21/32 | (2013.01) |
| G10L 17/06 | (2013.01) |
| G10L 25/51 | (2013.01) |
| H04W 4/02 | (2018.01) |

(52) U.S. Cl.
CPC .............. *G06F 3/167* (2013.01); *G06F 21/32* (2013.01); *G10L 17/06* (2013.01); *G10L 25/51* (2013.01); *H04W 4/02* (2013.01)

(58) Field of Classification Search
CPC ......... G06F 3/167; G06F 21/32; G10L 17/06; G10L 25/51; H04W 4/02
See application file for complete search history.

(56) References Cited

U.S. PATENT DOCUMENTS

| | | | |
|---|---|---|---|
| 8,538,757 B2* | 9/2013 | Patch | G10L 15/193 704/251 |
| 10,313,531 B2* | 6/2019 | Warrick | G06F 3/16 |
| 10,534,623 B2* | 1/2020 | Harper | G06F 3/048 |
| 11,183,182 B2* | 11/2021 | Wang | G10L 15/1815 |
| 11,184,660 B1 | 11/2021 | Ewanchuk et al. | |
| 2010/0169098 A1 | 7/2010 | Patch | |
| 2014/0052480 A1 | 2/2014 | Bell et al. | |
| 2014/0278419 A1 | 9/2014 | Bishop et al. | |
| 2015/0379981 A1* | 12/2015 | Balasubramanian | G06Q 30/0267 704/260 |

(Continued)

OTHER PUBLICATIONS

U.S. Appl. No. 17/104,974, filed Nov. 25, 2020, Voice Interaction Scripts.

(Continued)

*Primary Examiner* — Ariel Mercado-Vargas
(74) *Attorney, Agent, or Firm* — Perkins Coie LLP

(57) ABSTRACT

This disclosure describes systems and methods that identify activities for which scripts can be built to perform an activity when requested by a user. The scripts can be voice-activated by a defined customized voice command and can include delivery preferences. The user's identity can be verified by analyzing voice biometrics of the customized voice command. After performance of the activity, results can be delivered to the device in the format indicated in the script.

20 Claims, 5 Drawing Sheets

(56) References Cited

U.S. PATENT DOCUMENTS

| | | |
|---|---|---|
| 2016/0358603 A1 | 12/2016 | Azam et al. |
| 2018/0007060 A1* | 1/2018 | Leblang .................. G06F 21/32 |
| 2018/0047397 A1* | 2/2018 | Grover .................... G10L 15/26 |
| 2018/0167516 A1* | 6/2018 | Warrick .................... G06F 3/16 |
| 2018/0357645 A1 | 12/2018 | Caution et al. |
| 2019/0279627 A1* | 9/2019 | Wang .................... G06F 16/632 |
| 2019/0377489 A1 | 12/2019 | Han et al. |
| 2020/0227034 A1* | 7/2020 | Summa .................... G06F 3/013 |
| 2020/0320975 A1* | 10/2020 | Spata ...................... G10L 15/22 |
| 2020/0349951 A1 | 11/2020 | Das et al. |
| 2021/0119802 A1* | 4/2021 | Shetty .................. H04L 9/3228 |

OTHER PUBLICATIONS

U.S. Appl. No. 62/941,404, filed Nov. 27, 2019, Voice Interaction Scripts.

* cited by examiner

VOICE INTERACTION SCRIPTS

CROSS-REFERENCE TO RELATED APPLICATIONS

This application is a continuation of U.S. patent application Ser. No. 17/104,974, filed Nov. 25, 2020, now allowed, which is a non-provisional of and claims priority to U.S. Provisional Application No. 62/941,404, filed Nov. 27, 2019, entitled "VOICE INTERACTION SCRIPTS," which is hereby incorporated by reference in its entirety for all purposes.

This disclosure is directed generally to systems, methods, and apparatuses for providing voice interaction scripts.

BACKGROUND

Voice-controlled personal assistants are used for many things such as telling a user the weather, playing a song, and reading an email. For example, a person can ask or state, "Alexa, what is the weather today?" and Alexa® can navigate the Internet, find the weather, and provide an appropriate spoken response (e.g., "It will be 70 degrees today"). Such services are helpful in some but not all situations.

Figure 1:
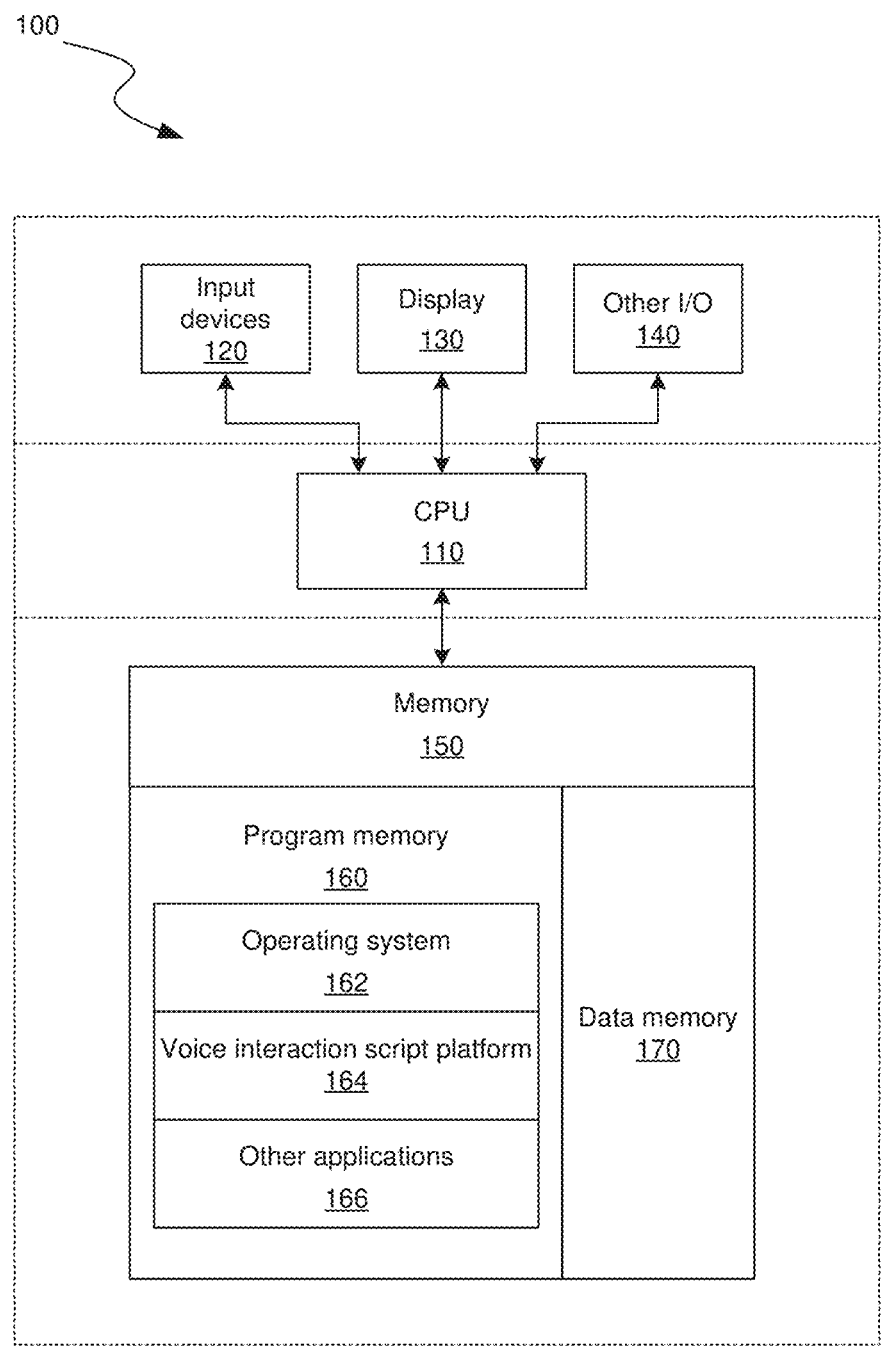
FIG. 1 is a block diagram illustrating an overview of devices on which some implementations can operate.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

People are increasingly finding and developing ways to simplify their lives. For example, people are using voice-controlled intelligent personal assistants to obtain information such as the weather and news, to order items, and to pay bills. Doing so saves the person from having to type on a computing device, locate a website or newsfeed and read the information. Although natural language processing technology is becoming increasingly better, some customers still experience frustration with the common misinterpretations and mistakes made by the machines during natural language processing. Additionally, not all requests are suitable for speaking a request or receiving a spoken answer. For example, information such as bank accounts and credit card balances are typically kept private. Moreover, sometimes users may wish to keep even the request for such information confidential.

To address the above-mentioned issues, the technology described herein provides a system and method that can build and use scripts that request an activity (e.g., provide bank account balances) and create a script. The script can include preferences for information delivery (e.g., device, format) and can be called or activated by a customized voice command (e.g., "totals" or "I love the rain") that is spoken to a virtual assistant. The virtual assistant can detect that the word or phrase and send the request to a server to determine which script should be called or the virtual assistant can identify the script. In some implementations, the user's identity is sent with the request (e.g., the sending device is registered to the user, credentials are sent) and verified by analyzing voice biometrics (i.e., comparing voice biometrics of the user stating the customized voice command with previous versions of the user stating the customized voice command). The activity can be performed, and the results can be delivered to a device in a format indicated in the script (e.g., mobile device and text message, respectively). Thus, a person can state a request aloud using a virtual assistant and receive answers privately in a preferred format. Additionally, the user can select a customized voice command that is easily processed by the virtual assistant or server so that natural language processing errors are less likely to occur.

In some implementations, the script is offered to be created in response to the user requesting the same activity more than one time. In other embodiments, the user receives a script creation offer for many or all requests. In some implementations, machine learning is used to analyze a set of scripts associated with the user. Based on the analysis, the user can receive script creation offers. In some implementations, menu options can be customized for the user based on the analysis.

This disclosure describes systems and processes designed to provide users a platform to request and receive confidential information and keep such information confidential. Various embodiments may provide one or more of the following technological improvements: (1) reduce natural language processing errors by using voice-activated scripts; (2) reduce communications and overall processing power by authenticating a user using a customized voice command that is also used to make a substantive request; (3) increase security of account information; and (4) provide increased flexibility in device and format delivery options.

In the following description, for the purposes of explanation, numerous specific details are set forth in order to provide a thorough understanding of embodiments of the present technology. It will be apparent, however, that embodiments of the present technology may be practiced without some of these specific details Suitable System Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that create scripts for voice interactions including requests. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol.

Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display 130 is separate from the input device. Examples of display devices are: an LCD display screen; a LED display screen; a projected, holographic, or augmented reality display (such as a heads-up display device or a head-mounted device); and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory 150 includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 150 is not a propagating signal divorced from underlying hardware; a memory is thus non-transitory. A memory 150 can include program memory 160 that stores programs and software, such as an operating system 162, voice interaction script platform 164, and other application programs 166. A memory 150 can also include data memory 170 that can include user identifying information (e.g., addresses, usernames, passwords, personal identification numbers, registered devices, biometric information); scripts; customized voice commands; historical information regarding use of applications, web browsing history; and other information which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
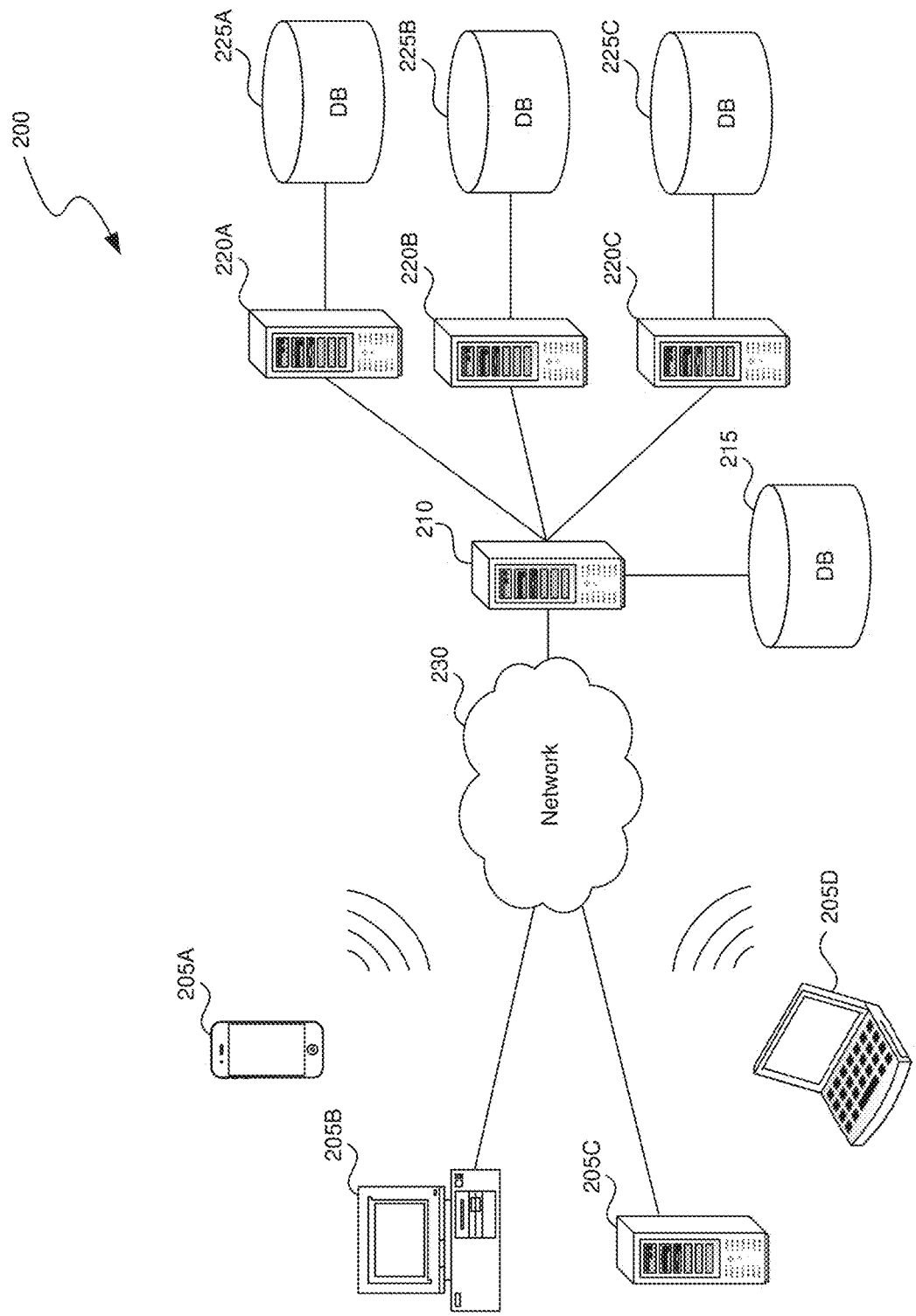
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210.

In some implementations, server computing device 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220A-C can each act as a server or client to other server/client devices. Server 210 can connect to a database 215. Servers 220A-C can each connect to a corresponding database 225A-C. As discussed above, each server 220A-C can correspond to a group of servers, and each of these servers can share a database or can have their own database. Databases 215 and 225 can warehouse (e.g., store) information such as scripts associated with a user, registered devices associated with a user, transactions or other activity made via an application. Though databases 215 and 225A-C are displayed logically as single units, databases 215 and 225A-C can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205A-D can be connected to network 230 through a network interface, such as by wired or wireless communication. While the connections between server 210 and servers 220A-C are shown as separate connections, these connections can be any kind of local, wide area, wired, or wireless network, including network 230 or a separate public or private network.

Figure 3:
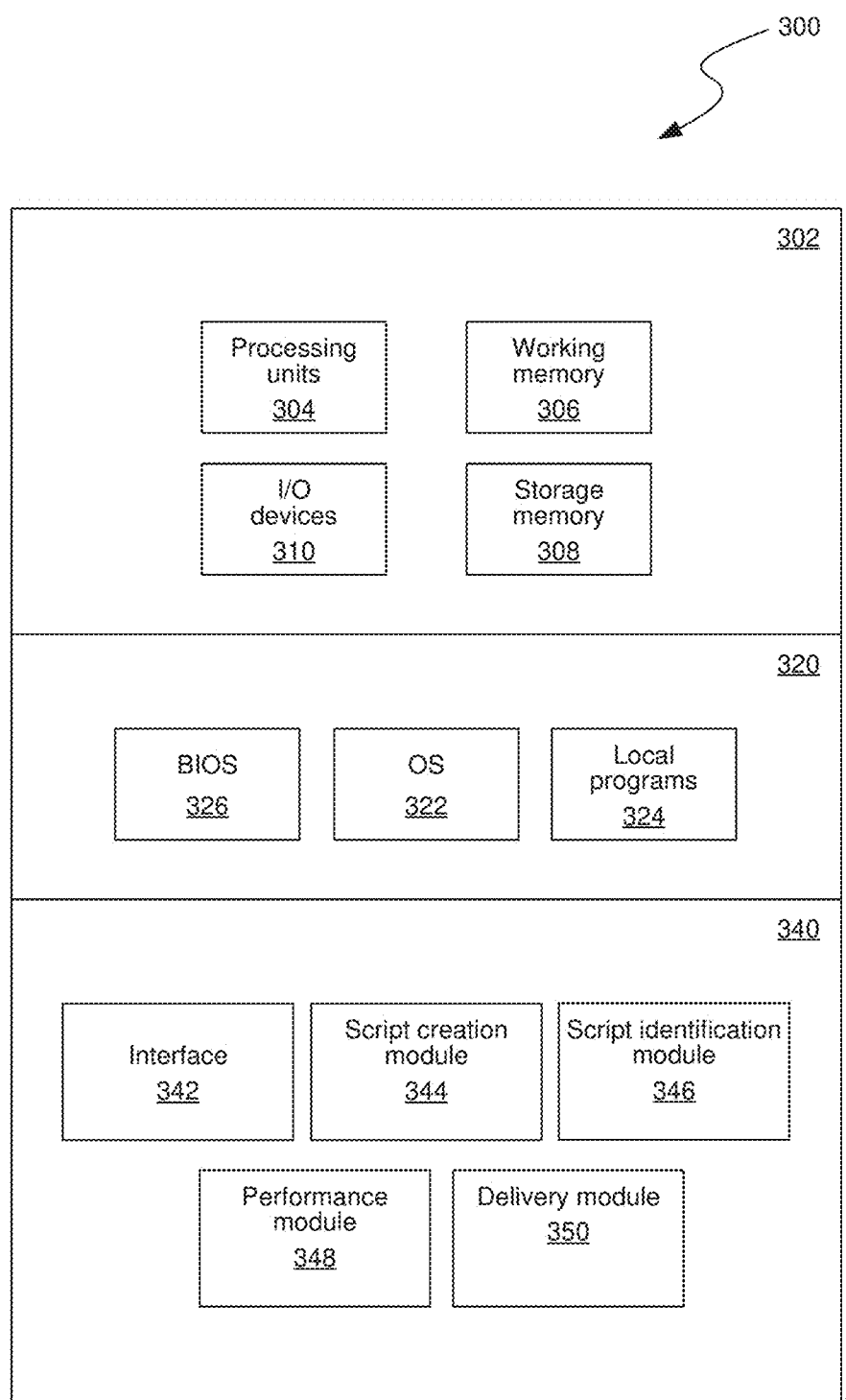
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Components 300 can be implemented in a client computing device such as client computing devices 205 or on a server computing device, such as server computing device 210 or 220A-C. In some embodiments, some components of components 300 can be implemented in a client computing device while others are implemented on a server computing device.

General software 320 can include various applications, including an operating system 322, local programs 324, and a basic input output system (BIOS) 326. Specialized components 340 can be subcomponents of a general software application 320, such as local programs 324. Specialized components 340 can include script creation module 344, script identification module 346, performance module 348, delivery module 350, and components that can be used for transferring data and controlling the specialized components, such as interface 342. In some implementations, components 300 can be in a computing system that is distributed across multiple computing devices or can be an interface to a server-based application executing one or more of specialized components 340.

Script creation module 344 identifies opportunities for script creation and displays the option (or causes the option to be displayed) on a device for the user to select. For example, if a user using a mobile application makes a request via the application more than one time or if the user spent over a threshold time navigating a website or mobile application to request an activity, script creation module 344 can display the option for creation of a script for that activity, which simplifies the user's request for the activity in the future. In some embodiments, script creation is available for activities regardless of the user's historical use or time spent navigating. In some implementations, machine learning techniques are used to analyze a set of scripts associated with the user and script creation module 344 can offer to create scrips for additional activities based on the analysis or customize menu options for the user based on the analysis. Thus, instead of having to navigate to request information or complete and activity, the user can state a command and have the activity initiated automatically.

In response to the user selecting to have a script created, script creation module 344 requests the user to provide delivery information such as a delivering device (i.e., device in which the results of the activity are to be delivered such as a mobile device), a deliverable format (i.e., format in which the results of the activity are to be delivered in such as text message, email, push notification), and a timing of delivery (e.g., day, time), and any other delivery rules (e.g., do not send if user is located at work location based on GPS or triangulation). Script creation module 344 further asks the user to indicate (e.g., provide or select from a list) a customized voice command that indicates the script that requests the activity. For example, if the user's request is to obtain the latest credit card balance, the user can select a customized voice command such as "show me the money" or "December" or any other word, phrase or sound. In some implementations, when the user selects the customized voice command, the user is asked to speak the customized voice command a few times so that script creation module 344 can have a sampling of the user speaking the customized voice command for biometric verification in the future. The customized voice commands can be identified to a virtual assistant so the virtual assistant can detect when a request is being made.

Script identification module 346 receives customized voice commands from a virtual assistant and uses the customized voice commands to identify the script. In some implementations, the virtual assistant provides identification information along with the customized voice command to script identification module 346. The customized voice command can be received as a spoken command or as text and can be spoken by a user to a virtual assistant implemented via a mobile device or a speaker system (e.g., Echo), or other device and then sent to an appropriate server (e.g., server associated with service provider). Additionally, the customized voice command can be used to authenticate the user using voice biometrics. In some implementations, the virtual assistant authenticates the user by receiving certain login information, using voice biometric information, and/or location information (e.g., network, GPS, triangulation). The user's voice biometric information speaking the customized voice command can be analyzed and compared to the previous versions of the user speaking the customized voice command. In this way, the customized voice command has a dual function: authentication information and script identification.

Performance module 348 receives the identity of a script from script identification module 346 and executes the activity defined in the script. The script includes delivery information including a device and a delivery format.

Delivery module 350 delivers the results of the activity (e.g., looking up bank account information ("you have $800 in Account 1"), paying a bill ("your Nordstrom bill for $200 was paid in full on September 2")) to the device identified in the script and in the format identified by the script (e.g., push notification, text message, email). For example, the results can be sent in a text message to a mobile device associated with the user. Thus, the user can state the customized voice command to a virtual assistant on the mobile device of the user or a separate device and receive the results on the device indicated in the script. In this way, the user can quickly request information in a confidential manner and receive the results in a confidential manner.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
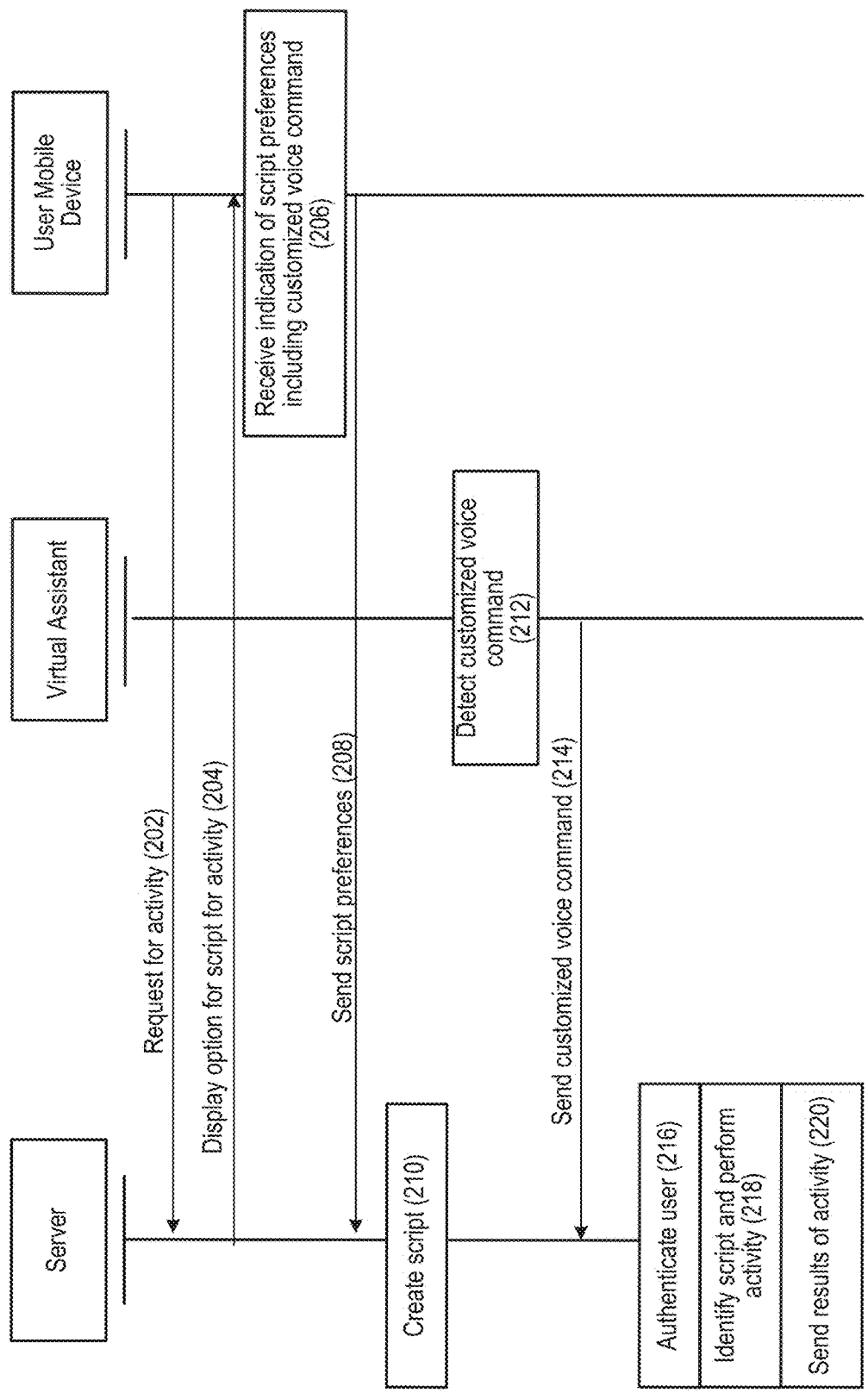
FIG. 4 is a flow diagram illustrating a process for creating and executing voice interaction scripts.

FIG. 4 is a flow diagram illustrating an example of a process for creating and executing voice interaction scripts. The virtual assistant shown in FIG. 4 can be implemented via the user mobile device (also shown in FIG. 4) or in a separate device. In operation 202, a user mobile device sends a request to a server to perform an activity (e.g., check account balance). In operation 204, the server can provide an option to create a script for the activity for future requests of the activity. The option can be displayed on the user mobile device. In operation 206, the user mobile device can receive from the user an indication of script preferences including delivery preferences and rules as well as a customized voice command. In operation 208, the user mobile device can send the script preferences to the server. The server can create the script using the script preferences in operation 210. In some alternative implementations, the user mobile device creates the script and sends the script to the server. The server provides customized voice commands to the virtual assistant so the virtual assistant can listen for the customized voice commands.

A virtual assistant communicably coupled to the server (e.g., implemented via the user mobile device or other device) detects the customized voice command in operation 212. The customized voice command or indication of receipt of the customized voice command is sent from the virtual assistant to the server in operation 214. The server identifies the user (e.g., via the device sending the request) and authenticates the user in operation 216. The server can then identify the script and perform the activity in operation 218. Results of the activity can be sent to the device indicated the script in operation 220. In some alternative embodiments, the virtual assistant identifies and authenticates the user, selects the script based on the customized voice command, and sends the script name to the server for performance of the request.

Figure 5:
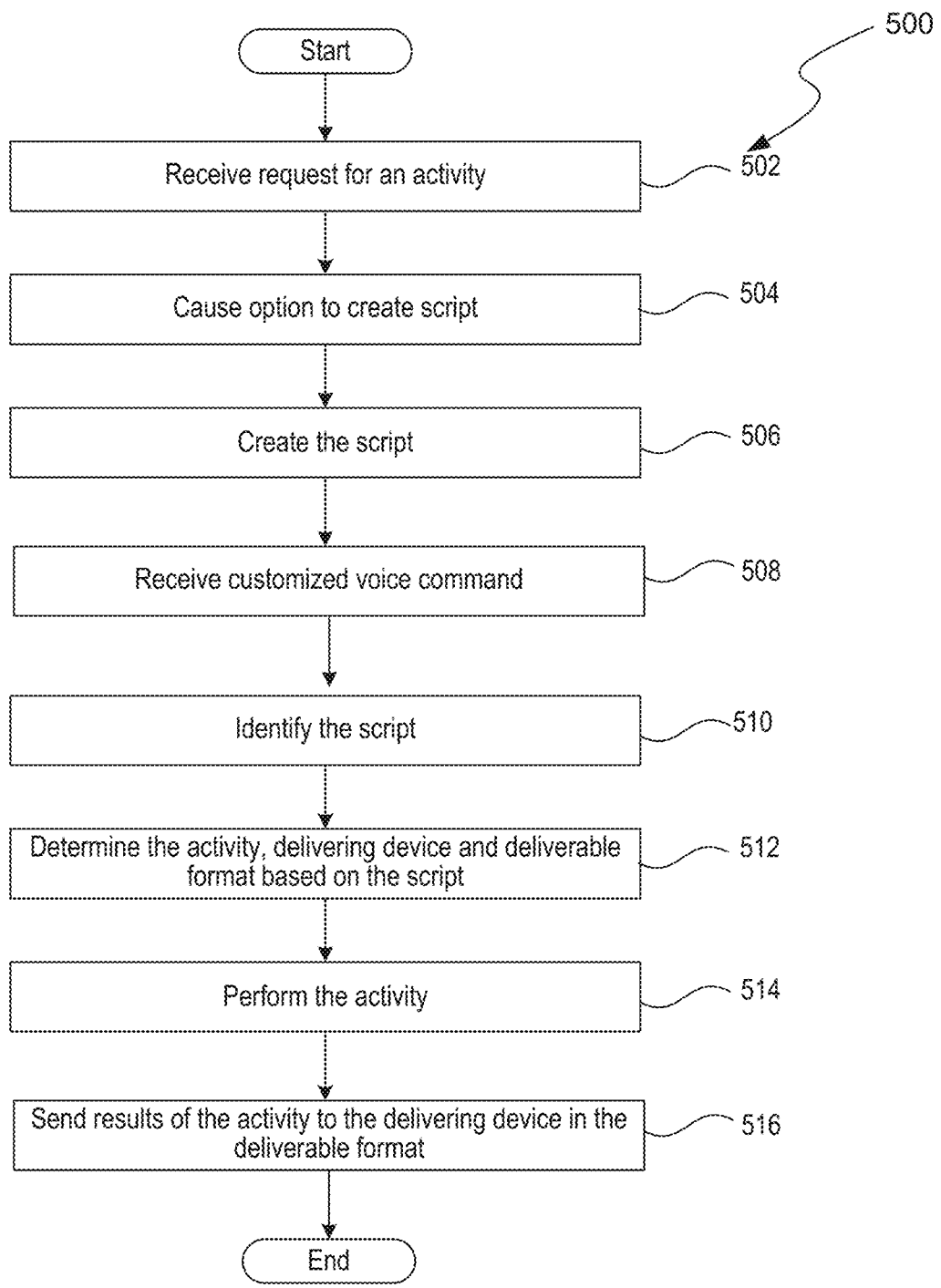
FIG. 5 is a flow diagram illustrating a process for creating and executing voice interaction scripts.

FIG. 5 is a flow diagram illustrating a process for creating and executing voice interaction scripts. Receiving operation 502 receives a request for an activity from a device associated with a user. Causing operation 504 causes the option to create a script for future requests for the activity to be displayed on the device associated with the user. Creating operation 506 creates the script upon receiving a response to create the script. Receiving operation 508 receives the customized voice command detected by a virtual assistant. Identifying operation 510 identifies the user (e.g., via the device sending the request), authenticates the user (e.g., using voice biometrics), and identifies the script based on the customized voice command. Determining operation 512 determines the activity, delivery device and delivery format based on the script. Performing operation 514 performs the activity and sending operation 516 sends results of the activity to the delivering device in the deliverable format.

In some embodiments, a non-transitory computer-readable medium comprising computer-readable instructions for providing data protection is described. The computer-readable instructions comprising instructions that when executed by a processor causes the processor to implement a method described in FIGS. 4 and 5, in the various embodiments in this patent document, and/or operations of the modules described in this patent document.

Those skilled in the art will appreciate that the components illustrated in the figures described above may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
    sending, from a first device associated with a user to at least one server, a first indication that the user has spent a threshold period of time navigating an application to request an activity;
    in response to sending the first indication, receiving, at the first device, an option to create a user-specific script for the activity;
    displaying the option on a display of the first device;
    receiving a selection, by the user, of the option; and
    in response to receiving the selection of the option, causing initiation for creating the user-specific script, by:
        sending, from the first device, a second indication of a delivery device, and
        sending a voice sample of the user, and a customized voice command for generating the user-specific script;
    after the user-specific script is created,
        detecting, at the first device, the customized voice command of the user-specific script; and
        receiving, at the first device, results for the activity in response to the user being authorized for the activity based on one or more voice characteristics in the customized voice command matching the voice sample associated with the user-specific script.

2. The method of claim 1, further comprising:
    creating, by the first device, the user-specific script based on the customized voice command for the user-specific script, the voice sample of the user, and the second indication of the delivery device; and
    sending the user-specific script to at least one platform.

3. The method of claim 1, further comprising:
    sending voice biometrics to at least one platform to authenticate the user.

4. The method of claim 1, further comprising:
    displaying one or more custom menu options for the user based on analysis by a machine learning platform that analyzes a set of scripts associated with the user.

5. The method of claim 1, wherein a deliverable format of a result to the activity is one of: words spoken on the delivery device, a text message sent to the delivery device, an email accessible by the delivery device, a push notification sent to the delivery device, or a message delivered to the application accessible by the delivery device.

6. The method of claim 1, wherein the user is authenticated based on a location of the first device associated with the user.

7. The method of claim 1,
    wherein the first device is a mobile device,
    wherein the delivery device is the mobile device, and
    wherein the user-specific script indicates that the delivery device is the mobile device and that a deliverable format of a result to the activity is a text message.

8. A system comprising:
    one or more processors; and
    one or more memories storing instructions that, when executed by the one or more processors, cause the system to perform a process comprising:
        sending, from a first device associated with a user to at least one server, a first indication that the user has spent a threshold period of time navigating an application to request an activity;
        in response to sending the first indication, receiving, at the first device, an option to create a user-specific script for the activity;
        displaying the option on a display of the first device;
        receiving a selection, by the user, of the option; and
        in response to receiving the selection of the option, causing initiation for creating the user-specific script, by:
            sending, from the first device, a second indication of a delivery device, and
            sending a voice sample of the user, and a customized voice command for generating the user-specific script;
        after the user-specific script is created,
            detecting, at the first device, the customized voice command of the user-specific script; and
            receiving, at the first device, results for the activity in response to the user being authorized for the activity based on one or more voice characteristics in the customized voice command matching the voice sample associated with the user-specific script.

9. The system according to claim 8, wherein the process further comprises:
    creating, by the first device, the user-specific script based on the customized voice command for the user-specific script, the voice sample of the user, and the second indication of the delivery device; and
    sending the user-specific script to at least one platform.

10. The system according to claim 8, wherein the process further comprises:
    sending voice biometrics to at least one platform to authenticate the user.

11. The system according to claim 8, wherein the process further comprises:
    displaying one or more custom menu options for the user based on analysis by a machine learning platform that analyzes a set of scripts associated with the user.

12. The system according to claim 8, wherein a deliverable format of a result to the activity is one of: words spoken on the delivery device, a text message sent to the delivery device, an email accessible by the delivery device, a push notification sent to the delivery device, or a message delivered to the application accessible by the delivery device.

13. The system according to claim 8, wherein the user is authenticated based on a location of the first device associated with the user.

14. The system according to claim 8,
wherein the first device is a mobile device,
wherein the delivery device is the mobile device, and
wherein the user-specific script indicates that the delivery device is the mobile device and that a deliverable format of a result to the activity is a text message.

15. A non-transitory computer-readable medium storing instructions that, when executed by a computing system, cause the computing system to perform operations comprising:
   sending, from a first device associated with a user to at least one server, a first indication that the user has spent a threshold period of time navigating an application to request an activity;
   in response to sending the first indication, receiving, at the first device, an option to create a user-specific script for the activity;
   displaying the option on a display of the first device;
   receiving a selection, by the user, of the option; and
   in response to receiving the selection of the option, causing initiation for creating the user-specific script, by:
      sending, from the first device, a second indication of a delivery device, and
      sending a voice sample of the user, and a customized voice command for generating the user-specific script;
   after the user-specific script is created,
      detecting, at the first device, the customized voice command of the user-specific script; and
         receiving, at the first device, results for the activity in response to the user being authorized for the activity based on one or more voice characteristics in the customized voice command matching the voice sample associated with the user-specific script.

16. The non-transitory computer-readable medium of claim 15, wherein the operations further comprise:
   creating, by the first device, the user-specific script based on the customized voice command for the user-specific script, the voice sample of the user, and the second indication of the delivery device; and
   sending the user-specific script to at least one platform.

17. The non-transitory computer-readable medium of claim 15, wherein the operations further comprise:
   sending voice biometrics to at least one platform to authenticate the user.

18. The non-transitory computer-readable medium of claim 15, wherein the operations further comprise:
   displaying one or more custom menu options for the user based on analysis by a machine learning platform that analyzes a set of scripts associated with the user.

19. The non-transitory computer-readable medium of claim 15, wherein a deliverable format of a result to the activity is one of: words spoken on the delivery device, a text message sent to the delivery device, an email accessible by the delivery device, a push notification sent to the delivery device, or a message delivered to the application accessible by the delivery device.

20. The non-transitory computer-readable medium of claim 15,
   wherein the user is authenticated based on a location of the first device associated with the user,
   wherein the first device is a mobile device,
   wherein the delivery device is the mobile device, and
   wherein the user-specific script indicates that the delivery device is the mobile device and that a deliverable format of a result to the activity is a text message.

* * * * *